Figure 2:
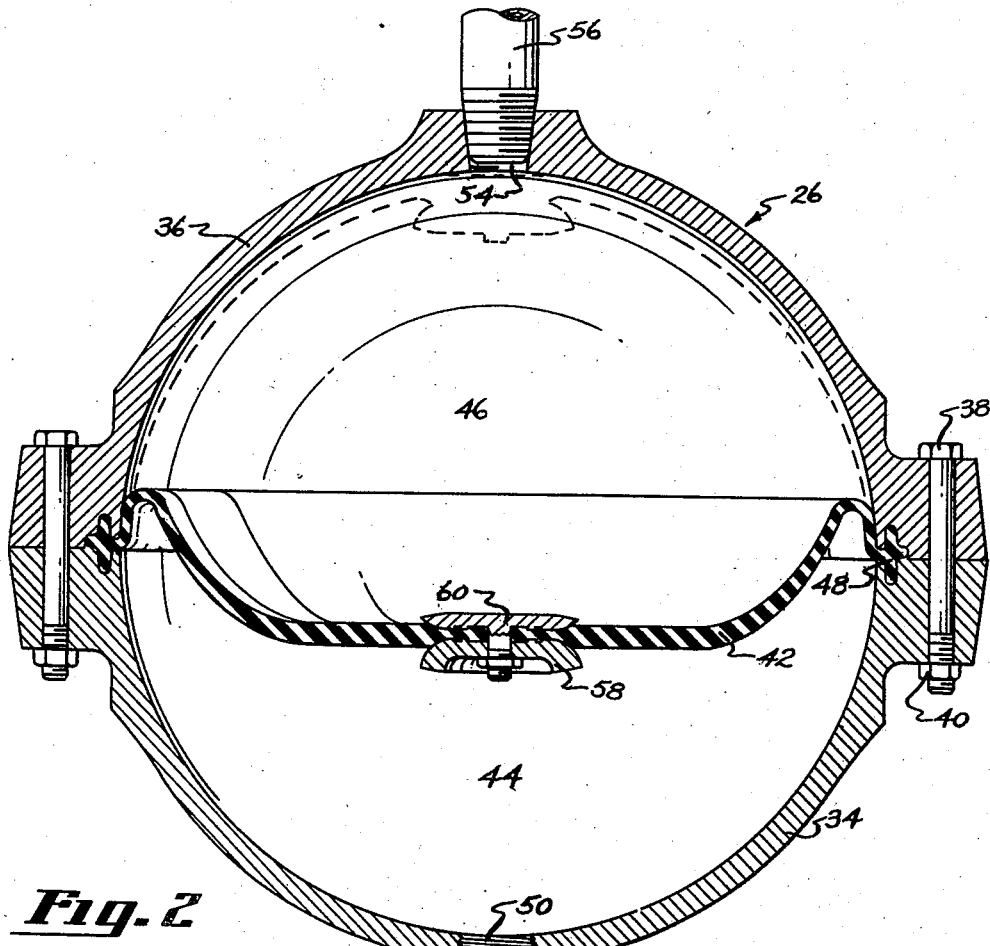

Nov. 3, 1942.   H. W. ADAMS ET AL   2,300,722
HYDRAULIC PRESSURE FLUID ACCUMULATOR
Original Filed March 20, 1939

INVENTORS.
HAROLD W. ADAMS
EARL S. KLEINHANS
BY J. Edwin Coates
ATTORNEY.

Patented Nov. 3, 1942

2,300,722

UNITED STATES PATENT OFFICE 2,300,722

HYDRAULIC PRESSURE FLUID ACCUMULATOR

Harold W. Adams and Earl Schuyler Kleinhans, Santa Monica, Calif., assignors to Douglas Aircraft Company, Incorporated, Santa Monica, Calif.

Original application March 20, 1939, Serial No. 262,958. Divided and this application December 9, 1939, Serial No. 308,414

2 Claims. (Cl. 138—30)

Our invention relates to hydraulic pressure fluid accumulators with particular reference to an accumulator of the spherical type adapted for use in a hydraulic system.

This application is a division of our copending application entitled "Hydraulic power transmission system," Serial No. 262,958, filed March 20, 1939.

Pressure fluid accumulators are utilized in hydraulic systems for various reasons, two of which are, namely; to absorb shocks and surges in the system resulting from variations in the pressure supply or variations in the demand of the hydraulically operated units; and to provide an emergency supply of pressure for operation of the various units in event of failure of the pressure supply.

Both of these uses are important in most hydraulic systems depending, of course, upon the function or purpose of the systems.

In aircraft, for instance, the emergency pressure supply feature is of great significance for the reason that more and more use is being made of hydraulic controls. To cite an example, let us assume that an airplane having a hydraulically operated retractable landing gear and hydraulically operated wing flaps is flying with the gear and flaps retracted when the hydraulic pressure supply fails. Without having an emergency pressure supply, it would be impossible for the pilot to either lower the flaps to reduce his landing speed or lower the wheels to land, whereas with an accumulator in the system, sufficient pressure would be retained to perform both of these operations at least once. One might assume an even more serious case wherein the hydraulic system is also utilized to drive the electric generator for radio operation and lighting and the necessity for a dependable accumulator is readily appreciated.

The dependability of the accumulator brings us to the value of our invention. Accumulators in the past have been relatively bulky and of the cylinder and piston type. They were not, as a rule, suitable for high pressures and were accustomed to leak, destroying their emergency effectiveness. Further, they were difficult to repair and repack, particularly without removing them from the aircraft. On the other hand, our accumulator is of small size but of great pressure capacity and is relatively leakproof, the construction being such that interior pressures increase the leakproofness rather than destroy it.

It is therefore an object of our invention to provide a dependable pressure accumulator for a hydraulic system.

Another object is to provide an accumulator of relatively high capacity but of small bulk and light weight.

Another object is to provide an accumulator of simple construction and of long service life which, however, is easily repaired when necessary.

Still another object is to provide a pressure accumulator wherein the contained oil and air are simply and effectively separated without affecting their cooperative functioning.

Other and further objects and advantages will become apparent as the description proceeds.

Figure 1:
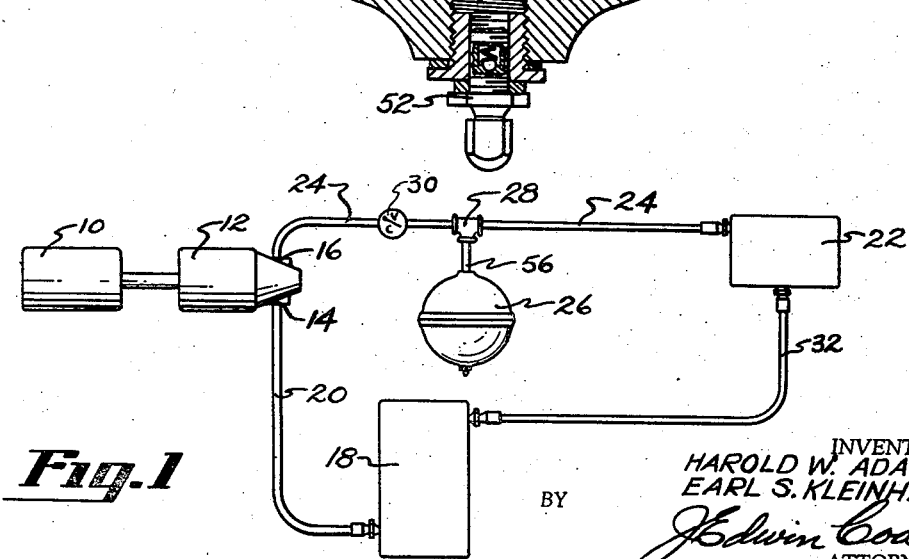

In the drawing:

Figure 1 is a schematic view of a typical hydraulic system incorporating our pressure accumulator; and Figure 2 is a sectional view of the accumulator showing the interior construction thereof.

Referring now to the drawing:

In Figure 1 is schematically shown a hydraulic system including a prime mover 10 adapted to drive a pump 12. The pump has a suction port 14 and a pressure port 16, the suction port being connected to a sump or fluid reservoir 18 by a pipe 20, and the pressure port being connected to a hydraulically operated unit 22 by a pipe 24.

Our pressure accumulator, indicated by the numeral 26 is teed into the pressure line 24 at 28 between a check valve 30 and the hydraulically operated unit 22. A return line 32 connects the driven unit 22 and the sump 18, thus completing the system.

The construction of the accumulator 26 is shown in detail in Figure 2. It is in effect a dual pressure tank made up of two dome-like shells 34 and 36 fastened together around their periphery by any suitable means such as bolts 38 and nuts 40. These shells are shown as being substantially hemispherical in the drawing but obviously they may be of any other desired shape which is suitable to withstand a high pressure, say of the order of 1500 pounds per square inch. A diaphragm 42 having suitable elastic and oil resisting properties is used to separate the accumulator into a primary chamber 44 and a secondary chamber 46 and to prevent the air from mixing with the liquid.

The diaphragm is provided with a circumferential bead 48 which is secured within grooves or recesses formed in the meeting faces of the shells. This bead is so formed, as shown in the drawing, that high pressures within the tank will force the bead into closer engagement with the surfaces of the joint and thus improve the sealing qualities.

The shell 34 is provided with a port 50 for entry of air, and a check valve 52 is threadedly engaged in the port 50 so that air or other gas may be supplied to chamber 44 and stored therein under pressure. The other shell 36 is provided with a port 54 which is connected by means of a pipe 56 into the hydraulic system at 28 as previously described.

In practice, air is stored in the chamber 44 under several hundred pounds pressure. Liquid is then supplied to the chamber 46 and to the hydraulically operated unit 22; this liquid being drawn by the pump 12 from reservoir 18 and forced under pressure into pipe 24. Positive pressure surges will be transmitted to the liquid in chamber 46 which chamber will consequently increase in volume, compressing the air in chamber 44 and increasing its pressure. As the surge dies out, the diaphragm will return to its normal position and the chambers will regain their normal relative volumes. A negative pressure surge will cause the reverse action as is apparent. It can be seen that the pressure fluid accumulator thus serves to absorb shocks which might otherwise damage the hydraulic system or affect the smooth operation thereof.

The accumulator also serves as an emergency source of pressure fluid in the event of a complete failure of the pump 12 or the prime mover 10. If such a failure occurs, the check valve 30 would immediately function, closing the pipe 24 and locking pressure in the system between the check valve and the operating unit 22. Since the air in chamber 44 is under a high initial pressure, it may then be used to force the oil out of chamber 46 until the entire volume is exhausted and the diaphragm assumes the position shown by the dotted line in Figure 2. In this way, pressure is available for emergency operation of the unit 22 as has been previously mentioned.

An important feature is the provision of the valve members 58 and 60. These are attached to the opposite faces of the diaphragm 42 substantially at its center. They may be of metal or other high strength material. If the diaphragm is forced against either of the ports 50 and 54 during operation, the members 58 and 60 will prevent the material of the diaphragm itself from being forced into the ports, thus avoiding possible damage. Moreover, should a leak develop in check valve 52, accompanied by some leakage through the diaphragm, the member 58 will seat around and seal the port 50, thus preventing loss of liquid from the system. The necessary strength and toughness at the center of the diaphragm may be obtained in other ways. For instance, a tough insert might be molded into the center of the diaphragm or the central portion might be made sufficiently thick and tough to prevent extrusion through the ports 50 and 54.

The diaphragm is preferably made with the general reverse curved configuration as shown in the drawing. This shape gives a fairly large volume to chamber 44 and, at the same time, provides sufficient material in the diaphragm to avoid excessive stretching when moved to the extreme upper or lower positions as indicated by the dotted lines.

In operation, the diaphragm reaches its fully extended, unstretched position in either direction while member 58 or 60 is still spaced from ports 50 or 54. This prevents wrinkling in the diaphragm which would allow member 58 or 60 to move off center. Additional pressure stretches the diaphragm and seats one of the valve members centrally over one of the ports. In order to avoid distortion, the diaphragm must be of high quality material and accurately dimensioned. In the diaphragms now in use the thickness at diametrically opposite points is maintained the same within .005 inch.

While we have shown a preferred embodiment in considerable detail and described it at length, it is obvious that many changes may be made in the details of construction without departing from the spirit of the invention and we aim to cover all such changes and modifications in the appended claims.

We claim:

1. In a hydraulic pressure system: a dual pressure tank comprising a plurality of shells defining a primary chamber and a secondary chamber having an elastic wall in common, the primary chamber having a substantially centrally located port and containing fluid under an initial pressure less than the governed liquid pressure of the system, the secondary chamber having a substantially centrally located port connected to the system, and the elastic wall having substantially rigid valve members on each side of said wall and located substantially at the center thereof for sealing either the primary port or the secondary port in response to a differential between the fluid and liquid pressures, and for protecting said elastic wall against extrusion through said ports.

2. A hydraulic pressure fluid accumulator comprising a pair of dome-like shells adapted to engage each other along a meeting plane to form a substantially closed container, means to hold them rigidly in engagement, a thin elastic member within said container and having a bead at its periphery, peripheral grooves in the meeting faces of said shells adapted to receive and tightly grip said bead between them, said elastic member dividing said container into a primary chamber and a secondary chamber, said primary chamber being adapted to contain air or other elastic fluid under pressure and being provided with a substantially centrally located port and a fitting for attachment to a source of fluid pressure, said secondary chamber being adapted to contain liquid and being provided with a substantially centrally located port and a fitting for attachment to a hydraulic system, said elastic member being provided with rigid valve means substantially centrally located on each side thereof adapted to seat respectively over one or the other of said ports upon extreme reduction of the volume of one or the other of said chambers, the engagement of said bead between said peripheral grooves serving as a seal to prevent leaking from one chamber to the other and from said chambers to the atmosphere.

HAROLD W. ADAMS.
EARL SCHUYLER KLEINHANS.